United States Patent
Eriksson et al.

(10) Patent No.: US 9,200,557 B2
(45) Date of Patent: Dec. 1, 2015

(54) METHOD PERTAINING TO AIR REMOVAL FROM A DOSING SYSTEM AT AN SCR SYSTEM AND A SCR SYSTEM

(75) Inventors: Lars Eriksson, Järna (SE); Ulf Carlsson, Södertälje (SE); Andreas Liljestrand, Södertälje (SE); Per Bremberg, Södertälje (SE)

(73) Assignee: SCANIA CV AB (SE)

( * ) Notice: Subject to any disclaimer, the term of this patent is extended or adjusted under 35 U.S.C. 154(b) by 81 days.

(21) Appl. No.: 13/704,751

(22) PCT Filed: Jun. 20, 2011

(86) PCT No.: PCT/SE2011/050801
§ 371 (c)(1),
(2), (4) Date: Jan. 17, 2013

(87) PCT Pub. No.: WO2011/162702
PCT Pub. Date: Dec. 29, 2011

(65) Prior Publication Data
US 2013/0111882 A1    May 9, 2013

(30) Foreign Application Priority Data
Jun. 21, 2010    (SE) .................... 1050641-8

(51) Int. Cl.
*F01N 3/10* (2006.01)
*F01N 9/00* (2006.01)
(Continued)

(52) U.S. Cl.
CPC .. *F01N 9/00* (2013.01); *F01N 3/10* (2013.01); *F01N 3/208* (2013.01); *F01N 3/2066* (2013.01);
(Continued)

(58) Field of Classification Search
CPC ... F01N 2610/1466; F01N 11/00; F01N 3/10; F01N 3/2066; F01N 3/208; F01N 9/00; F01N 2610/02; F01N 2610/14; Y02T 10/24; Y02T 10/47
USPC ............................................ 60/274, 286, 295
See application file for complete search history.

(56) References Cited

U.S. PATENT DOCUMENTS

| 5,606,856 A | 3/1997 | Linder et al. .................... 60/286 |
| 5,794,667 A * | 8/1998 | Payne et al. ................... 141/128 |

(Continued)

FOREIGN PATENT DOCUMENTS

| DE | 199 47 197 | 4/2001 |
| DE | 10 2004 050 022 | 4/2006 |

(Continued)

OTHER PUBLICATIONS

International Search Report dated Oct. 11, 2011 issued in corresponding international patent application No. PCT/SE2011/050801.
(Continued)

*Primary Examiner* — Thomas Denion
*Assistant Examiner* — Brandon Lee
(74) *Attorney, Agent, or Firm* — Ostrolenk Faber LLP (57) ABSTRACT

A method pertaining to an SCR system in which reducing agent in liquid form is supplied to a feed device (230) and via which feed device reducing agent is supplied to at least one consumption point (250) from a container (205): the steps of continuously detecting the feed pressure (P) which the feed device (230) furnishes, and controlling the operation of the feed device (230) on the basis of changes (P') in the feed pressure (P), with the object of reducing the impact of unwanted air supply at the feed device (230). Also pertaining to a computer program product containing program code (P) for a computer (200; 210) for implementing a method according to the invention. Also an SCR system and a motor vehicle which is equipped with the SCR system are disclosed.

21 Claims, 4 Drawing Sheets

(51) Int. Cl.
*F01N 3/20* (2006.01)
*F01N 11/00* (2006.01)

(52) U.S. Cl.
CPC ............ *F01N 11/00* (2013.01); *F01N 2610/02* (2013.01); *F01N 2610/14* (2013.01); *F01N 2610/1466* (2013.01); *Y02T 10/24* (2013.01); *Y02T 10/47* (2013.01); *Y10T 137/0324* (2015.04); *Y10T 137/7722* (2015.04)

(56) References Cited

U.S. PATENT DOCUMENTS

| | | | |
|---|---|---|---|
| 6,375,432 B1 * | 4/2002 | Krasny et al. | 417/46 |
| 6,470,673 B1 | 10/2002 | van Nieuwstadt et al. | 60/286 |
| 7,607,292 B2 | 10/2009 | Kobayashi | 60/286 |
| 8,302,394 B2 * | 11/2012 | Ochi | 60/403 |
| 8,307,636 B2 | 11/2012 | Matsunaga | 60/286 |
| 2001/0020452 A1 | 9/2001 | Suzuki et al. | 123/41.1 |
| 2003/0161947 A1 * | 8/2003 | Tuyls et al. | 427/240 |
| 2004/0060286 A1 | 4/2004 | Huber et al. | |
| 2006/0269807 A1 | 11/2006 | Fujita et al. | 429/26 |
| 2007/0289289 A1 | 12/2007 | Kojima et al. | 60/280 |
| 2008/0022654 A1 | 1/2008 | Broderick et al. | 60/274 |
| 2008/0245058 A1 | 10/2008 | Boddy et al. | 60/286 |
| 2009/0205316 A1 | 8/2009 | Dougnier et al. | 60/274 |
| 2011/0083424 A1 * | 4/2011 | Wang et al. | 60/277 |
| 2011/0146241 A1 * | 6/2011 | Hodgson et al. | 60/274 |
| 2013/0104527 A1 | 5/2013 | Liljestrand et al. | 60/274 |
| 2013/0111880 A1 | 5/2013 | Liljestrand et al. | 60/274 |
| 2013/0111881 A1 | 5/2013 | Liljestrand et al. | 60/274 |
| 2013/0118153 A1 | 5/2013 | Liljestrand et al. | 60/274 |
| 2013/0125532 A1 | 5/2013 | Eriksson et al. | 60/274 |

FOREIGN PATENT DOCUMENTS

| | | |
|---|---|---|
| DE | 10 2006 020 439 | 11/2007 |
| DE | 10 2007 000 666 | 7/2008 |
| DE | 10 2007 039 794 | 3/2009 |
| DE | 10 2008 030 756 A1 | 1/2010 |
| DE | 10 2008 052 988 | 4/2010 |
| DE | 10 2009 056 181 | 6/2011 |
| JP | 58-210387 | 12/1983 |
| JP | 59-517 | 1/1984 |
| JP | H2-122906 | 10/1990 |
| JP | H6-159176 | 6/1994 |
| JP | 9-96212 | 4/1997 |
| JP | H9-96212 | 4/1997 |
| JP | 2000-240436 | 9/2000 |
| JP | 2002-38941 | 2/2002 |
| JP | 2003-511599 | 3/2003 |
| JP | 2004-293494 | 10/2004 |
| JP | 2005-307769 | 11/2005 |
| JP | 2008-69731 | 3/2008 |
| JP | 2008-95570 | 4/2008 |
| JP | 2008169711 | 7/2008 |
| JP | 2008-220163 | 9/2008 |
| JP | 2009-006081 | 1/2009 |
| JP | 2009-526168 | 7/2009 |
| JP | 2010-133354 | 6/2010 |
| WO | WO 2007/091969 | 8/2007 |
| WO | WO 2007/124779 | 11/2007 |
| WO | WO 2007/124791 | 11/2007 |
| WO | WO 2008149541 A1 * | 12/2008 |
| WO | WO 2009/053806 | 4/2009 |
| WO | WO 2009156281 A1 * | 12/2009 |

OTHER PUBLICATIONS

International Search Report mailed Oct. 5, 2011 in corresponding PCT International Application No. PCT/SE2011/050786.
International Search Report mailed Oct. 6, 2011 in corresponding PCT International Application No. PCT/SE2011/050789.
International Search Report mailed Oct. 5, 2011 in corresponding PCT International Application No. PCT/SE2011/050785.
International Search Report mailed Oct. 6, 2011 in corresponding PCT International Application No. PCT/SE2011/050792.
International Search Report mailed Oct. 11, 2011 in corresponding PCT International Application No. PCT/SE2011/050802.
English translation of Japanese Office Action dated Oct. 21, 2014 issued in JP 2013-516545.

* cited by examiner

METHOD PERTAINING TO AIR REMOVAL FROM A DOSING SYSTEM AT AN SCR SYSTEM AND A SCR SYSTEM

CROSS-REFERENCE TO RELATED APPLICATIONS

The present application is a 35 U.S.C. §§371 national phase conversion of PCT/SE2011/050801, filed Jun. 20, 2011, which claims priority of Swedish Application No. 1050641-8, filed Jun. 21, 2010, the contents of which are incorporated by reference herein. The PCT International Application was published in the English language.

TECHNICAL FIELD

The present invention relates to a method pertaining to an SCR system. The invention relates also to a computer programme product containing programme code for a computer for implementing a method according to the invention. The invention relates also to an SCR system and a motor vehicle which is equipped with the SCR system.

BACKGROUND

Vehicles today use, for example, urea as reductant in SCR (selective catalytic reduction) systems which comprise an SCR catalyst in which said reductant and NOx gas can react and be converted to nitrogen gas and water. Various types of reductants may be used in SCR systems. AdBlue is an example of a commonly used reductant.

One type of SCR system comprises a container which holds a reductant. The SCR system has also a pump adapted to drawing said reductant from the container via a suction hose and to supplying it via a pressure hose to a dosing unit situated adjacent to an exhaust system of the vehicle, e.g. adjacent to an exhaust pipe of the exhaust system. The dosing unit is adapted to injecting a necessary amount of reductant into the exhaust pipe upstream of the SCR catalyst according to operating routines which are stored in a control unit of the vehicle. To make it easier to regulate the pressure when there are small or no dosing amounts, the system comprises also a return hose which runs back to the container from a pressure side of the system. This configuration makes it possible to cool the dosing unit by means of the reductant which, during cooling, flows from the container via the pump and the dosing unit and back to the container. The dosing unit is thus provided with active cooling. The return flow from the dosing unit to the container may be substantially constant and is currently not controlled or regulated by means of appropriate valves or such units.

In certain conditions, air may enter the SCR system upstream of the pump. This may for example occur during start-up of the SCR system after its initial fitting, in which case there will be air in the suction hose.

Air may also enter the suction hose when the SCR system has used up all the available reductant in the container, in which case the container will be empty of reductant, the pump runs dry and air is drawn into it via the suction hose.

Another example is that air may enter the suction hose in situations where there is a limited amount of reductant left in the container in the SCR system and said SCR system moves in such a way that splashing occurs in the container, in which case air may be drawn into the pump via the suction hose.

A further example is that the suction hose may be incorrectly fitted to the pump such that air leakage occurs on the upstream side of the pump. Here again air may be drawn into the pump via the suction hose or at a faulty or damaged seal between the suction hose and the pump.

An example is that the suction hose may itself be frayed or defective in such a way as to allow air to be drawn into the pump via the hose.

Any air entering the pump on an inlet side of it will adversely affect the reductant flow in the SCR system, thereby reducing a cooling power of the dosing unit, with potential risk of overheating of temperature-sensitive components of the dosing unit.

Emissions of the SCR system may also be adversely affected by presence of air at the pump in that the reductant supply to the dosing unit will be limited.

Any presence of air at the pump in the SCR system adversely affects a working pressure of the dosing unit. Building up a normal working pressure of the SCR system also currently takes quite a long time when there is air in the pump.

DE 102008030756 A1 refers to detection of air downstream of a pump for supplying a dosing unit with reducing agent in an SCR system and for clearing gas bubbles etc. from a line between the pump and the dosing unit by means of reducing agent via a valve and a return line for leading reducing agent back to a reducing agent tank.

There is thus a need to improve current SCR systems in order to reduce or eliminate the above disadvantages.

SUMMARY OF THE INVENTION

An object of the present invention is to propose a novel and advantageous method for improving the performance of an SCR system.

Another object of the invention is to propose a novel and advantageous SCR system and a novel and advantageous computer programme for improving the performance of an SCR system.

An object of the present invention is to propose a novel and advantageous method for reducing the amount of undesirable emissions in an SCR system when there is air in said SCR system.

A further object of the invention is to propose an alternative method pertaining to an SCR system and an alternative computer programme pertaining to an SCR system, and an alternative SCR system.

Another object of the invention is to propose a method pertaining to an SCR system whereby a working pressure of the reducing agent can be built up more quickly than in the state of the art when there is air in a feed device.

These objects are achieved with a method pertaining to an SCR system whereby reducing agent in liquid form is supplied to a feed device via which reducing agent is supplied to at least one consumption point from a container, according to the disclosure herein.

An aspect of the invention proposes a method pertaining to an SCR system whereby reducing agent is supplied to a feed device via which reducing agent is supplied to at least one consumption point from a container, comprising the step of continuously detecting the feed pressure furnished by the feed device, and of controlling the operation of the feed device on the basis of changes in said feed pressure, with the object of reducing the impact of unwanted air supply at the feed device. This makes it possible for a working pressure of the reducing agent to be built up more quickly than in the state of the art in the presence of air supplied upstream to a feed device.

The method may further comprise the step of altering the operation of the feed device in correlation with the changes in said feed pressure. This makes it possible for a working pressure of the reducing agent to be built up more quickly than in the state of the art in the presence of air supplied upstream to a feed device. In cases where the feed pressure drops because air is for various reasons supplied upstream of the feed device, a speed of the pump may also thereupon be lowered. In cases where the feed pressure increases after having been temporarily reduced because air has for various reasons been supplied upstream of the feed device, a speed of the pump may thereupon also be increased. This makes it possible for the operation of the feed device to be altered in a correlated way in response to the changes in said feed pressure according to the invention.

Control of the operation of said feed device may be by means of a pump speed of the feed device. The result is an effective way of controlling the feed device according to an aspect of the invention. Pump speed might also be called pump rate or pump frequency.

Control of the operation of said feed device may be with respect to a predetermined level of the feed pressure which the feed device is intended to furnish. This predetermined level denotes a predetermined working pressure at which the SCR system is intended to operate. Said predetermined level of the working pressure which the feed device is intended to furnish may be any desired suitable level. The result is a flexible solution which is easy to adapt to different types of SCR systems. The result is a versatile solution to the above problems.

Control of the operation of said feed device may be based on the time derivative of said detected feed pressure. Continuously taking into the account the time derivative of the feed pressure and controlling the operation of the feed device on the basis thereof results in an effective method according to the invention. This solution does not involve much calculation capacity, since a time derivative of the feed pressure can quickly and easily be determined by appropriate calculation means. The result is a method which can quickly adapt the control of the feed device in response to sudden changes in the feed pressure caused by presence of air at the feed device.

The method may further comprise the steps of:

determining presence of air supplied upstream to the feed device, and when such presence is found, controlling the operation of the feed device on the basis of changes in said feed pressure.

Thus optimising the SCR system's start-up time in the presence of air supplied to the feed device means that NOx emissions can be reduced in certain applications where the SCR system is used to supply a reducing agent to an SCR system. Start-up time means a time from when air is found at the feed device to when a desired working pressure of the liquid supply system is reached. According to an aspect of the invention, the start-up time may with advantage be shorter than, for example, three minutes.

The method may further comprise the step of:

determining said presence on the basis of detected operating power of a power source which is adapted to powering said feed device and/or on the basis of a determined time during which deviant operation of the feed device takes place.

Detecting feed device behaviour characterised by presence of air at the feed device makes it possible for the feed device to be controlled according to the invention in order thereby to improve or optimise the SCR system's start-up time.

The feed device may be a diaphragm pump. The feed device may be any suitable pump, e.g. a gear pump.

Said at least one consumption point may be a dosing unit.

To minimise the impact of air or air bubbles upon the SCR system, the innovative method may be applied to continuously adapt an operating power of the feed device to a prevailing situation, particularly taking into account the time derivative of the feed pressure of the feed device. A positive effect of the innovative method is that a better mean efficiency of the feed device in the presence of air at it can be achieved.

The method is easy to implement in existing motor vehicles. Software pertaining to an SCR system whereby reducing agent is supplied to a feed device via which reducing agent is supplied to at least one consumption point from a container according to the invention may be installed in a control unit of the vehicle during the manufacture of the vehicle. A purchaser of the vehicle may thus have the possibility of selecting the function of the method as an option. Alternatively, software which comprises programme code for applying the innovative method pertaining to an SCR system whereby reducing agent is supplied to a feed device via which reducing agent is supplied to at least one consumption point from a container may be installed in a control unit of the vehicle on the occasion of upgrading at a service station, in which case the software may be loaded into a memory in the control unit. Implementing the innovative method is therefore cost-effective, particularly as no further sensors or components need be installed in the vehicle. Relevant hardware is currently already provided in the vehicle. The invention therefore represents a cost-effective solution to the problems indicated above.

Software comprising programme code pertaining to an SCR system whereby reducing agent in liquid form is supplied to a feed device via which reducing agent is supplied to at least one consumption point from a container is easy to update or replace. Moreover, different parts of the software comprising programme code pertaining to an SCR system whereby reducing agent in liquid form is supplied to a feed device via which reducing agent is supplied to at least one consumption point from a container may be replaced independently of one another. This modular configuration is advantageous from a maintenance perspective.

An aspect of the invention proposes an SCR system adapted to supplying reducing agent in liquid form to a feed device which is itself adapted to supplying reducing agent to at least one consumption point from a container, comprising:

means for continuously detecting the feed pressure furnished by the feed device, and means for controlling the operation of the feed device on the basis of changes in said feed pressure, with the object of reducing the impact of unwanted air supply at the feed device.

The SCR system may further comprise means for altering the operation of the feed device in correlation with the changes in said feed pressure.

In the SCR system, control of the operation of said feed device may be by means of a pump speed of the feed device.

In the SCR system, control of the operation of said feed device may be with respect to a predetermined level of the feed pressure which the feed device is intended to furnish.

In the SCR system, control of the operation of said feed device may be based on the time derivative of said detected feed pressure.

The SCR system may further comprise:

means for determining presence of air supplied upstream to the feed device, and means for, when such presence is found, controlling the operation of the feed device on the basis of changes in said feed pressure.

The SCR system may further comprise:
means for determining said presence on the basis of detected operating power of a power source which is adapted to powering said feed device, and/or on the basis of a determined time during which deviant operation of the feed device takes place.

The feed device may be a diaphragm pump. Said at least one consumption point may be a dosing unit.

The above objects are also achieved with a motor vehicle which comprises the SCR system. The vehicle may be a truck, bus or passenger car.

An aspect of the invention proposes a computer programme pertaining to an SCR system whereby reducing agent in liquid form is supplied to a feed device via which reducing agent is supplied to at least one consumption point from a container, which programme contains programme code stored on a computer-readable medium for causing an electronic control unit or another computer connected to the electronic control unit to perform steps according to the disclosure herein.

An aspect of the invention proposes a computer programme pertaining to an SCR system whereby reducing agent in liquid form is supplied to a feed device via which reducing agent is supplied to at least one consumption point from a container, which programme contains programme code for causing an electronic control unit or another computer connected to the electronic control unit to perform steps according to the disclosure herein.

An aspect of the invention proposes a computer programme product containing a programme code stored on a computer-readable medium for performing method steps according to the disclosure herein when said programme is run on an electronic control unit or another computer connected to the electronic control unit.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE DRAWINGS

Figure 1:
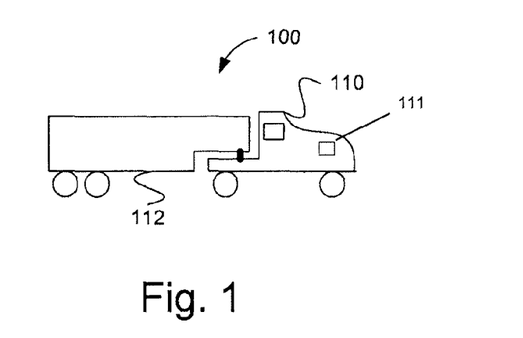
FIG. 1 illustrates schematically a vehicle according to an embodiment of the invention.

FIG. 1 depicts a side view of a vehicle 100. The exemplified vehicle 100 comprises a tractor unit 110 with a trailer 112. The vehicle may be a heavy vehicle, e.g. a truck or a bus. The vehicle may alternatively be a passenger car.

It should be noted that the invention is applicable to any SCR system and is therefore not restricted to SCR systems of motor vehicles. The innovative method and the innovative SCR system according to an aspect of the invention are well suited to other platforms which have an SCR system than motor vehicles, e.g. watercraft. The watercraft may be of any kind, e.g. motorboats, steamers, ferries or ships.

The innovative method and the innovative SCR system according to an aspect of the invention are also well suited to, for example, systems which comprise industrial engines and/or engine-powered industrial robots.

The innovative method and the innovative SCR system according to an aspect of the invention are also well suited to various kinds of power plants, e.g. an electric power plant comprising a diesel generator.

The innovative method and the innovative SCR system are well suited to any engine system which comprises an engine and an SCR system, e.g. on a locomotive or some other platform.

The innovative method and the innovative SCR system are well suited to any system which comprises a $NO_x$ generator and an SCR system.

The feed device may be any feed device and need not be a diaphragm pump as herein described.

The term "link" refers herein to a communication link which may be a physical connection such as an opto-electronic communication line, or a non-physical connection such as a wireless connection, e.g. a radio link or microwave link.

The term "line" refers herein to a passage for holding and conveying a fluid, e.g. a reducing agent in liquid form. The line may be a pipe of any suitable size. The line may be made of any suitable material, e.g. plastic, rubber or metal.

The term "reductant" or "reducing agent" refers herein to an agent used for reacting with certain emissions in an SCR system. These emissions may for example be NOx gas. The terms "reductant" and "reducing agent" are herein used synonymously. Said reductant according to a version is so-called AdBlue. Other kinds of reductants may of course be used. AdBlue is herein cited as an example of a reductant, but specialists will appreciate that the innovative method and the innovative device are feasible with other types of reductants, subject to necessary adaptations, e.g. adaptations to adequate freezing points for chosen reductants, in control algorithms for executing software code in accordance with the innovative method.

Figure 2:
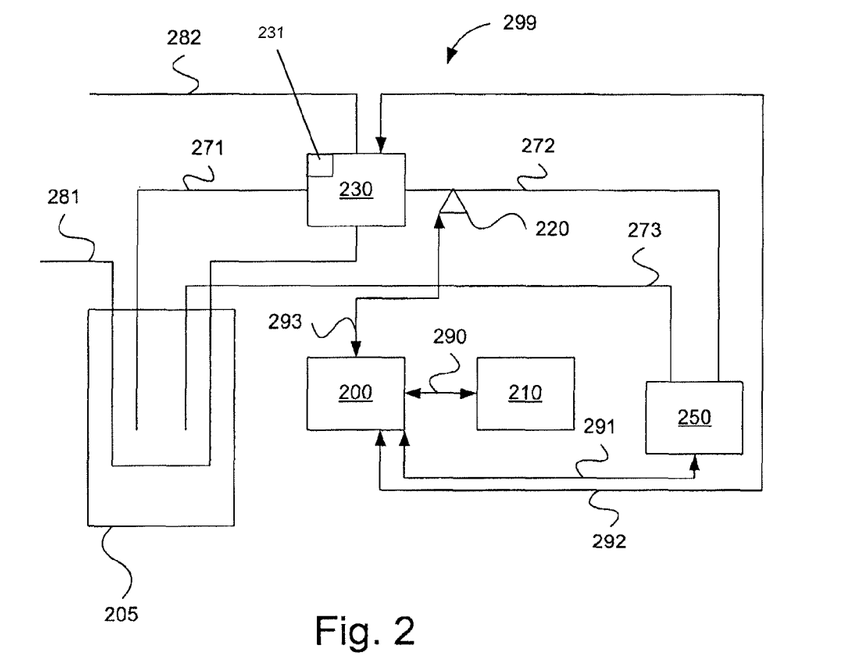
FIG. 2 illustrates schematically a subsystem for the vehicle depicted in FIG. 1, according to an embodiment of the invention.

FIG. 2 depicts a subsystem 299 of the vehicle 100. The subsystem 299 is situated in the tractor unit 110. The subsystem 299 may be part of an SCR system. The subsystem 299 comprises in this example a container 205 arranged to hold a reductant. The container 205 is adapted to containing a suitable amount of reductant and to being replenishable as necessary. The container might accommodate, for example, 75 or 50 liters of reductant.

A first line 271 is adapted to leading the reductant to a pump 230 from the container 205. The pump 230 may be any suitable pump. The pump 230 may be a diaphragm pump provided with at least one filter. The pump 230 is adapted to being driven by an electric motor (not depicted). The pump 230 is adapted to drawing the reductant from the container 205 via the first line 271 and supplying it via a second line 272 to a dosing unit 250. The dosing unit 250 comprises an electrically controlled dosing valve by means of which a flow of reductant added to the exhaust system can be controlled. The pump 230 is adapted to pressurising the reductant in the second line 272. The dosing unit 250 is provided with a throttle unit against which said pressure of the reductant is built up in the subsystem 299. This pressure is herein referred to as the working pressure of the SCR system.

The dosing unit 250 is adapted to supplying said reductant to an exhaust system (not depicted) of the vehicle 100. More specifically, the dosing unit 250 is adapted to supplying a suitable amount of reductant in a controlled way to an exhaust system of the vehicle 100. According to this version, an SCR catalyst (not depicted) is situated downstream of a location in the exhaust system where the reductant supply is effected. The amount of reductant supplied in the exhaust system is intended to be used in a conventional way in the SCR catalyst for reducing the amount of undesirable emissions in a known way.

The dosing unit 250 is situated adjacent to, for example, an exhaust pipe which is provided to lead exhaust gases from a combustion engine (not depicted) of the vehicle 100 to the SCR catalyst. The dosing unit 250 is in thermal contact with the exhaust system of the vehicle 100. This means that thermal energy stored in, for example, an exhaust pipe, silencer and SCR catalyst can thus be led to the dosing unit.

The dosing unit 250 comprises an electronic control card adapted to handling communication with a control unit 200. The dosing unit 250 comprises also plastic and/or rubber components which might melt or be otherwise adversely affected by too high temperatures.

The dosing unit 250 is sensitive to temperatures above a certain value, e.g. 120 degrees Celsius. As, for example, the exhaust pipe, the silencer and the SCR catalyst of the vehicle 100 exceed this temperature value, there is risk that the dosing unit might overheat during or after operation of the vehicle if not provided with cooling.

A third line 273 runs between the dosing unit 250 and the container 205. The third line 273 is adapted to leading back to the container 205 a certain amount of the reductant fed to the dosing valve 250. This configuration achieves with advantage cooling of the dosing unit 250. The dosing unit 250 is thus cooled by a flow of the reductant as it is pumped through the dosing unit 250 from the pump 230 to the container 205.

A first radiator liquid line 281 is adapted to holding and conveying coolant for an engine of the vehicle 100. The first radiator liquid line 281 is partly situated in the container 205 in order to warm the reductant present therein if the reductant is cold. In this example, the first radiator liquid line 281 is adapted to leading radiator liquid which has been warmed by the vehicle's engine in a closed circuit through the container 205, via the pump 230 and a second radiator liquid line 282 back to the engine of the vehicle 100. According to a version, the first radiator liquid line 281 is configured with a substantially U-shaped portion situated in the container 205, as schematically depicted in FIG. 2. This configuration achieves improved warming of the reductant in the container 205 when the reductant is at too low a temperature to function in a desirable way. It should be noted that the first radiator liquid line 281 may be of any suitable configuration. If the reductant is at a temperature which exceeds a predetermined value, warming of the reductant by the radiator liquid is deactivated automatically.

A first control unit 200 is arranged for communication with a pressure sensor 220 via a link 293. The pressure sensor 220 is adapted to detecting a prevailing pressure of the reductant where the sensor is fitted. According to this version, the pressure sensor 220 is situated adjacent to the second line 272 in order to measure a working pressure of the reductant downstream of the pump 230. The pressure sensor 220 is adapted to continuously sending signals to the first control unit 200 which contain information about a prevailing pressure of the reductant.

The first control unit 200 is arranged for communication with the pump 230 via a link 292. The first control unit 200 is adapted to controlling operation of the pump 230 in order for example to regulate the reductant flows within the subsystem 299. The first control unit 200 is adapted to controlling an operating power of the pump 230 by regulating its associated electric motor. The first control unit 200 is adapted to controlling a speed of the pump 230. In particular, the first control unit 200 is adapted to controlling a speed of the pump 230 on the basis of changes in/time derivatives of the pump's feed pressure. This is advantageous according to the invention in situations where air is supplied to the SCR system upstream of the pump 230.

The first control unit 200 is adapted to determining a prevailing operating power of the pump's electric motor, which operating power may be altered in response to presence of air at the pump 230. If air enters the first line 271, a supply current to the pump is altered on the basis thereof. The first control unit 200 is adapted to monitoring the pump 230 in order to be able to detect behaviour which is due to presence of air at the pump 230. In a similar way, the first control unit 200 is adapted to monitoring a feed pressure of the reductant downstream of the pump 230 in order to be able to detect behaviour which is due to presence of air at the feed device.

The first control unit 200 is arranged for communication with the dosing unit 250 via a link 291. The first control unit 200 is adapted to controlling operation of the dosing unit 250 in order for example to regulate the reductant supply to the exhaust system of the vehicle 100. The first control unit 200 is adapted to controlling operation of the dosing unit 250 in order for example to regulate the reductant return supply to the container 205.

The first control unit 200 is adapted, according to a version, to using the signals received which contain a prevailing pressure of the reductant in the region of the pressure sensor 220 as a basis for controlling the pump 230 in accordance with an aspect of the innovative method. In particular, according to a version, the first control unit 200 is adapted to continuously calculating time derivatives of the prevailing pressure of the reductant on the basis of the signals received which contain a prevailing pressure of the reductant in the region of the pressure sensor 220, and to controlling a speed of the pump 230 on the basis of said time derivatives.

The first control unit 200 is adapted, according to a version, to using the signals received from the pump 230 which contain information about a prevailing actual operating power of the pump 230 as a basis for continuously or intermittently determining corresponding time derivatives, and controlling said pump 230 in accordance with an aspect of the innovative method. In particular, the first control unit 200 is adapted, according to a version, to using the signals received which contain a prevailing actual operating power of the pump 230 as a basis for controlling the latter's operation when there is found to be air at the inlet of the pump 230 or in the pump 230, in accordance with an aspect of the innovative method.

A second control unit 210 is arranged for communication with the first control unit 200 via a link 290. The second control unit 210 may be detachably connected to the first control unit 200. The second control unit 210 may be a control unit external to the vehicle 100. The second control unit 210 may be adapted to performing the innovative method steps according to the invention. The second control unit 210 may be used to cross-load software to the first control unit 200, particularly software for applying the innovative method. The second control unit 210 may alternatively be arranged for communication with the first control unit 200 via an internal network in the vehicle. The second control unit 210 may be adapted to performing substantially similar functions to those of the first control unit 200, e.g. using the signals received which contain a prevailing pressure of the reductant in the region of the pressure sensor 220 as a basis for determining corresponding time derivatives thereof, and controlling operation of the pump 230 on the basis of said time derivatives. The innovative method may be applied by the first control unit 200 or the second control unit 210, or by both the first control unit 200 and the second control unit 210.

Figures 3A, 3B:
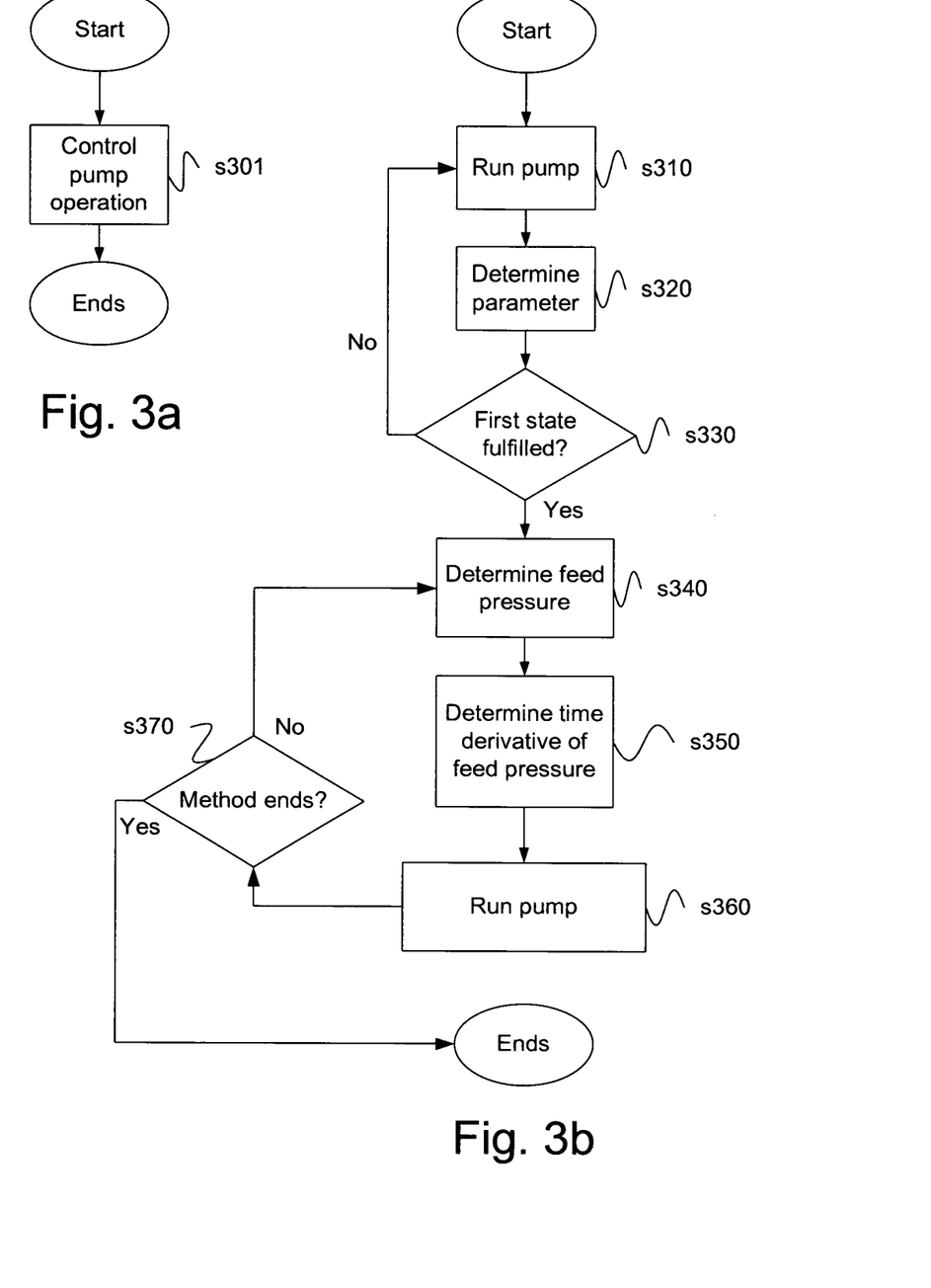
FIG. 3a is a schematic flowchart of a method according to an embodiment of the invention.
FIG. 3b is a more detailed schematic flowchart of a method according to an embodiment of the invention.

FIG. 3a is a schematic flowchart of a method pertaining to an SCR system whereby reducing agent is supplied to a feed device via which reducing agent is supplied to at least one consumption point from a container, according to an embodiment of the invention. The method comprises a first step s301. Method step s301 comprises the steps of continuously detecting the feed pressure furnished by the feed device, and of controlling the operation of the feed device on the basis of changes in said feed pressure, with the object of reducing the impact of unwanted air supply at the feed device. The method ends after step s301.

FIG. 3b is a schematic flowchart of a method pertaining to an SCR system whereby reducing agent in liquid form is supplied to a feed device via which reducing agent is supplied to at least one consumption point from a container, according to an embodiment of the invention.

The method comprises a first step 310. Method step s310 comprises the step of initiating operation of the pump 230. Step s310 is followed by a step s320.

Method step s320 comprises the step of determining a number of values for at least one operating parameter. This operating parameter may for example be a prevailing feed pressure P of the SCR system's reductant downstream of the pump 230. Another operating parameter might be an actually prevailing operating power of the pump 230. Step s320 is followed by a step s330.

Method step s330 comprises the step of using the values for the at least one parameter as a basis for deciding whether a first state is fulfilled. The first state may be a state characterised by presence of air at the pump 230. The first state may be a state which comprises presence of air supplied to the pump 230. According to an example it may be decided that the first state is fulfilled if a prevailing feed pressure of the SCR system's reductant begins to drop from a prevailing level. According to another example it may be decided that the first state is fulfilled if an actually prevailing operating power of the pump 230 is altered from a value which represents an operating power of it during ordinary operation to a value which is below a predetermined value. If the first state is fulfilled, a subsequent step s340 is performed.

Alternatively, the first state may be determined if a change of sign of the first-order time derivative of the feed pressure may be found, indicating that the feed pressure is dropping. According to an example the first state may be determined if the second-order time derivative of the feed pressure is equal to zero (0), indicating that the feed pressure is neither increasing nor decreasing. According to an example the first state may be determined if a change of sign from positive to negative of the second-order time derivative is found, indicating that the previously increasing feed pressure is beginning to drop.

If the first state is not fulfilled, step s310 is performed again.

According to a version, method steps s310-s330 are optional, which means for example that the innovative method may begin at the step s340 described below.

Method step s340 comprises the step of determining a value for the feed pressure P of the reducing agent downstream of the pump 230. This may be done by means of the pressure sensor 220. The pressure sensor 220 is adapted to sending to the first control unit 200 a signal which contains information about a prevailing feed pressure P of the reducing agent downstream of the pump 230. Step s340 is followed by a step s350.

Method step s350 comprises the step of determining a value for the first-order time derivative P' of the feed pressure P determined at step s340.

Determination of the first-order time derivative P' may be by means of the first control unit 200. Step s350 is followed by a step s360.

Method step s360 comprises the step of controlling the operation of the feed device on the basis of changes in said feed pressure P, with the object of reducing the impact of unwanted air supply at the pump 230. This entails a speed of the pump 230 being adapted on the basis of the value of said first-order time derivative P' of the feed pressure P, according to an aspect of the invention. Step s360 is followed by a step s370.

Method step s370 comprises the step of determining whether the method should end or not. If it is found that it should, the method ends. If it is found that the method should not end, step s340 is performed again, making it possible to continuously control a speed of the pump 230 on the basis of changes in the feed pressure P of the reducing agent downstream of the pump 230 of the SCR system.

According to the invention, the adaptive method described makes it possible to relatively quickly restore a desirable working pressure of the SCR system by controlling the speed of the pump 230 on the basis of changes in the feed pressure as above, particularly when there is air at the pump 230.

Figure 4A:
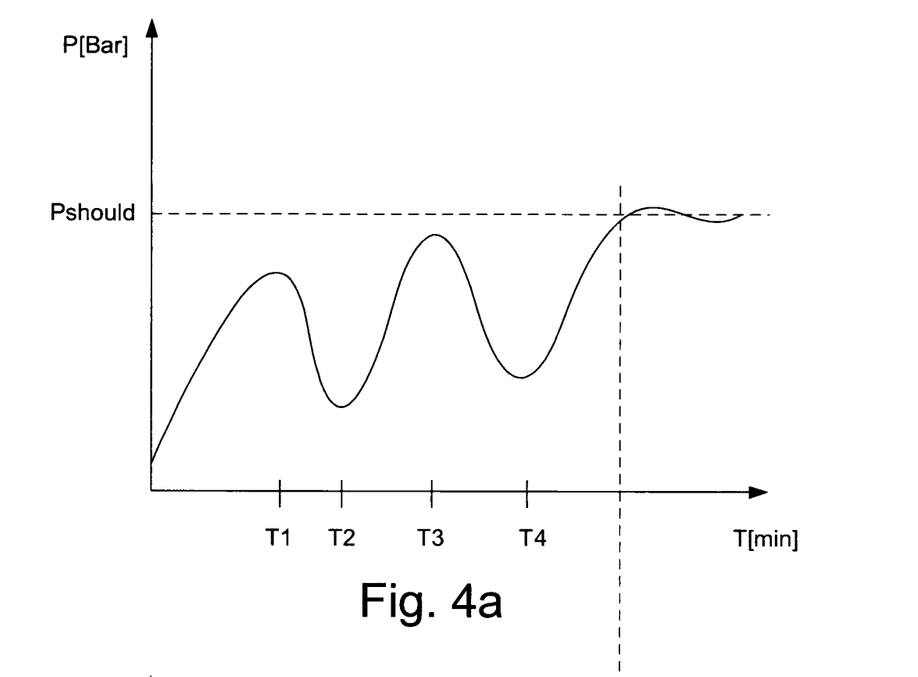
FIG. 4a is a schematic diagram of feed pressure as a function of time.

FIG. 4a is a schematic diagram of feed pressure P of the reducing agent downstream of the pump 230 as a function of time T. The SCR system is adapted to being operated at a predetermined feed pressure Pshould (the SCR system's desired working pressure). When the pump 230 starts running, the feed pressure downstream of it increases until a time T1 at which unwanted air enters the pump 230. Thereupon the pressure drops until a second time T2 at which the pump is once again able to begin to build up the feed pressure. At a third time T3, air enters the pump 230 again, whereupon the feed pressure drops until a fourth time T4 at which the pump is again able to begin building up the feed pressure to a desired working pressure Pshould.

Figure 4B:
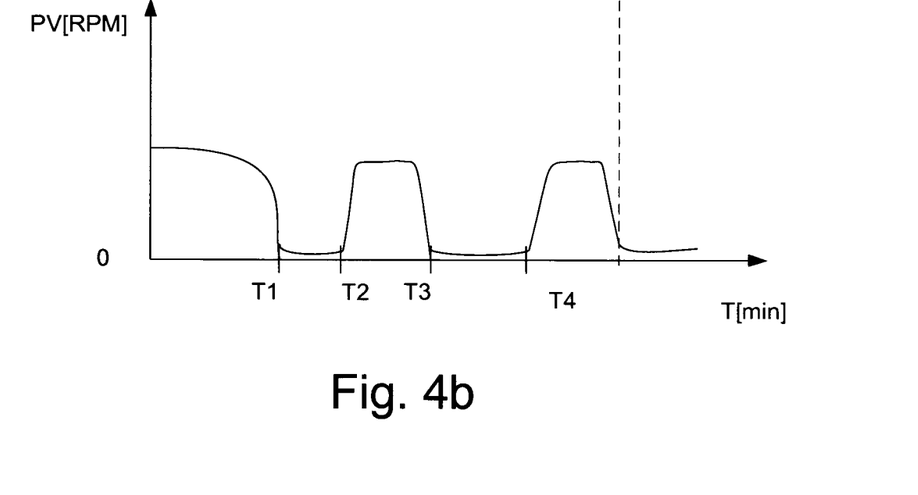
FIG. 4b is a schematic diagram of pump speed as a function of time.

FIG. 4b is a schematic diagram of the speed PV of the pump 230 as a function of time T. It should be noted that the first control unit 200 is adapted to continuously determining the first-order time derivative P' of the continuously detected values of the feed pressure P. The first control unit 200 is also adapted to determining the second-order time derivative P'' of the continuously detected values of the feed pressure P. At time T1 it may be found that air has entered the pump 230. There are various ways in which this might happen. According to an example a change of sign of the first-order time derivative may be found, indicating that the feed pressure is dropping. According to an example it may be found that the second-order time derivative is equal to zero (0), indicating that the feed pressure is neither increasing nor decreasing. According to an example a change of sign from positive to negative of the second-order time derivative may be found, indicating that the previously increasing feed pressure is beginning to drop.

On the basis of the magnitude of the feed pressure P, the first control unit 200 can control the speed PV of the first-order time derivative of the pump 230. According to a preferred example, the first control unit 200 may control the speed PV of the pump 230 on the basis of a magnitude of the first-order time derivative P' of the feed pressure P in a correlated way, which means that if the feed pressure P drops at a certain rate a pump speed may be lowered correspondingly. Similarly, the first control unit 200 may control the speed PV of the pump 230 on the basis of a magnitude of the first-order time derivative P' of the feed pressure P in a correlated way when the feed pressure is increasing, which means that if the feed pressure P increases at a certain rate a pump speed may be increased correspondingly.

The diagram shows the pump speed PV being controlled on the basis of changes in the feed pressure P until a desirable working pressure Pshould is reached.

It shows the pump speed PV dropping until time T1. It shows the pump speed PV as relatively low between the first time T1 and the second time T2. It shows the pump speed PV increasing after time T2 when the feed pressure P begins to increase, before subsequently dropping to a relatively low level at the third time T3. It shows the pump speed PV as relatively low between the third time T3 and the fourth time T4. It shows the pump speed PV increasing after time T4 when the feed pressure P begins to increase, before subsequently decreasing again to any suitable level when the feed pressure P stabilises.

According to an example the curve of the pump speed PV follows relatively well the shape of a curve for the first-order time derivative P' of the feed pressure P. This means that a main principle of the invention is that the faster the feed pressure P rises the higher the pump speed PV becomes. Similarly, the pump speed PV is reduced on the basis of how quickly the feed pressure drops. When the feed pressure P is dropping, the pump speed PV is relatively low.

The pump speed may be controlled in any suitable way on the basis of the first-order derivative of the feed pressure P. The result is adaptive control of the speed of the pump in order in an effective way to make it possible to build up the SCR system's feed pressure to a desirable level when there is air at the pump 230, according to an aspect of the invention.

A positive effect is that the innovative method makes it possible to shorten a period of time between two peaks of the feed pressure, e.g. the period T1-T3. The result is that the desirable working pressure Pshould can be built up more quickly than in the state of the art when there is air at the pump 230.

Figure 5:
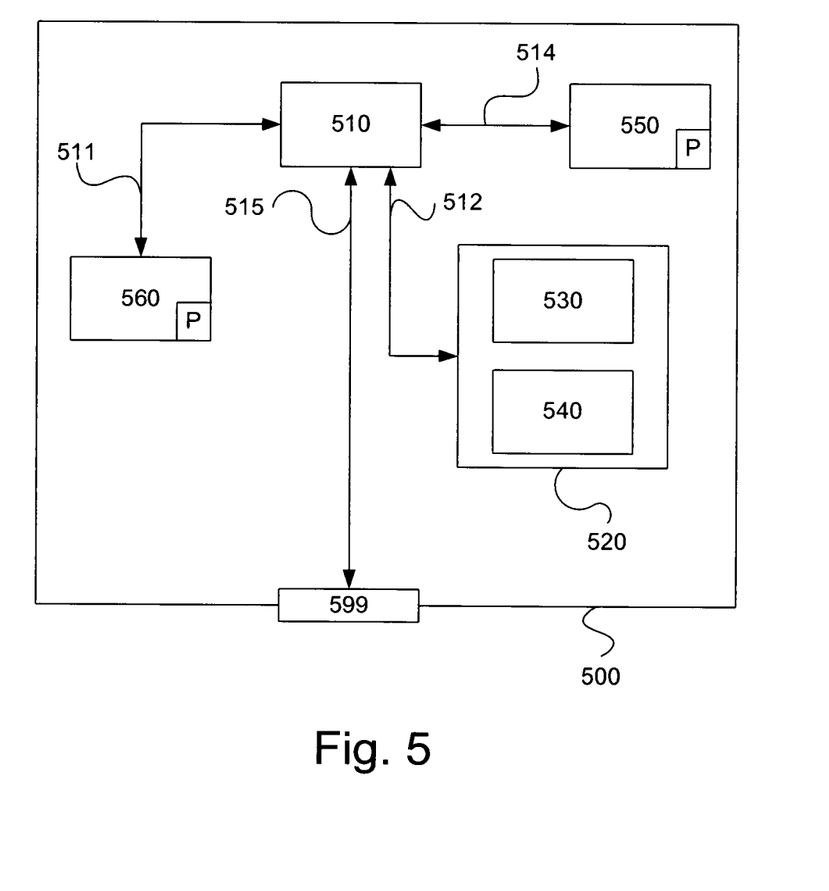
FIG. 5 illustrates schematically a computer according to an embodiment of the invention.

FIG. 5 is a diagram of a version of a device 500. The control units 200 and 210 described with reference to FIG. 2 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the devices 200 and/or 210. The device 500 further comprises a bus controller, a serial communication port, I/O means, an A/D converter, a time and date input and transfer unit, an event counter and an interruption controller (not depicted). The non-volatile memory 520 has also a second memory element 540.

A proposed computer programme P comprises routines for the purpose, where reducing agent is supplied to a feed device via which reducing agent is supplied to at least one consumption point from a container of an SCR system, of continuously controlling the operation of the pump on the basis of changes in a continuously detected feed pressure of reducing agent downstream of the pump 230 in the SCR system, with the object of reducing the impact of unwanted air supply at the feed device.

The programme P comprises routines for continuously controlling a speed of the pump on the basis of values for time derivatives of a continuously detected feed pressure of reducing agent downstream of the pump 230 in the SCR system, with the object of reducing the impact of unwanted air supply at the feed device.

The programme P comprises routines for altering the operation of the feed device in correlation with the changes in said feed pressure, in accordance with the innovative method.

The programme P comprises routines for controlling the operation of said feed device, e.g. by influencing a prevailing pump speed, with respect to a predetermined level of the feed pressure which the feed device is intended to furnish.

The programme P comprises routines for determining presence of air supplied upstream to the feed device and, when such presence is found, for controlling the operation of the feed device on the basis of changes in the continuously detected feed pressure of the reducing agent downstream of the SCR system's pump 230.

The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560, or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514. The data port 599 may for example have the links 290, 292 and 293 connected to it (see FIG. 2).

When data are received on the data port 599, they are stored temporarily in the second memory element 540. When input data have been temporarily stored, the data processing unit 510 is prepared to effect code execution as described above. According to a version, signals received on the data port 599 contain information about actually prevailing operating power of the pump 230. According to a version, signals received on the data port 599 contain information about a feed pressure of the reductant. Said feed pressure is a prevailing feed pressure downstream of the pump 230. The signals received on the data port 599 may be used by the device 500 to determine presence of air supplied to the pump 230 and, when such presence is found, to control the operation of the feed device on the basis of changes in said feed pressure, with the object of reducing the impact of unwanted air supply at the feed device.

Parts of the methods herein described may be effected by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method pertaining to an SCR system for an engine, the method comprising:
   supplying reducing agent in liquid form from a container to a pump and then supplying said reducing agent by the pump to at least one consumption point in the SCR system;
   continuously detecting the feed pressure furnished by the pump and reporting the feed pressure to an automated controller;
   determining automatically a presence of air upstream of the pump based on the feed pressure reported;
   continuously detecting an increase or decrease in the feed pressure when the presence of the air upstream of the pump is determined; and
   controlling the pump automatically, by the automated controller, when the presence of the air is determined, such that a pump speed is increased according to the increase in the feed pressure, and the pump speed is decreased according to the decrease in the feed pressure.

2. A method according to claim 1, further comprising altering the operation of the pump correlated with the changes in the feed pressure.

3. A method according to claim 1, further comprising controlling the operation of the pump with respect to a predetermined level of the feed pressure which the pump is intended to furnish.

4. A method according to claim 1, further comprising controlling the operation of the pump based on a time derivative of the detected feed pressure.

5. A method according to claim 1, further comprising the step of:
   determining said presence of air based on a detected operating power of a motor which is configured to powering the pump and/or based on a determined time during which deviant operation of the pump takes place.

6. A method according to claim 1, wherein the pump is a diaphragm pump.

7. A method according to claim 1, wherein the at least one consumption point is a dosing valve.

8. An SCR dosing system comprising a pump, and the system being configured for supplying reducing agent in liquid form from a container to the pump, the system comprising:
   the pump;
   at least one consumption point which is supplied with reducing agent from the pump;
   a pressure detector comprising a sensor configured for continuously detecting feed pressure furnished by the pump; and
   a microcontroller including an automated data processor including control logic configured:
   to continuously detect the feed pressure furnished by the pump;
   to determine automatically a presence of air upstream of the pump based on the detected feed pressure;
   to continuously detect an increase or decrease in the feed pressure when the presence of the air upstream of the pump is determined; and
   to control the pump automatically, when the presence of the air is determined, such that a PUMP speed is increased according to the increase in the feed pressure, and the pump speed is decreased according to the decrease in the feed pressure.

9. An SCR system according to claim 8, further comprising a motor for altering the operation of the pump correlated with the changes in the feed pressure.

10. An SCR system according to claim 8, wherein a pump speed of the pump is selected for controlling the operation of the pump.

11. An SCR system according to claim 8, wherein the operation of said pump is controllable with respect to a predetermined level of the feed pressure which the pump is intended to furnish.

12. AN SCR system according to claim 8, wherein the operation of the pump is controllable based on a time derivative of the detected feed pressure.

13. An SCR system according to claim 8, wherein the presence of air is determined based on detected operating power of a power source which is configured to power the pump and/or based on a determined time during which deviant operation of the pump takes place.

14. An SCR system according to claim 8, wherein the pump comprises a diaphragm pump.

15. An SCR system according to claim 8, wherein the at least one consumption point is a dosing valve.

16. A motor vehicle comprising
   an engine; and
   an SCR system according to claim 8.

17. A motor vehicle according to claim 16, comprising a truck, bus or passenger car.

18. An SCR system according to claim 8, wherein the microcontroller is configured to determine a first order time derivative P' of the feed pressure,
   wherein the controlling automatically of the operation of the pump is performed such that the change in pump speed is set according to the P'.

19. An SCR system according to claim 8, wherein the microcontroller is configured to determine a second order time derivative P" of the feed pressure,
   wherein the controlling automatically of the operation of the pump is performed such that the change in pump speed is set according to the P".

20. A method according to claim 1, wherein the automated controller is configured to determine a first order time derivative P' of the feed pressure,
   wherein the controlling automatically of the operation of the pump is performed such that the change in pump speed is set according to the P'.

21. A method according to claim 1, wherein the automated controller is configured to determine a second order time derivative P" of the feed pressure,
   wherein the controlling automatically of the operation of the pump is performed such that the change in pump speed is set according to the P".

* * * * *